INVENTORS
CLINTON D. BURDICK
SEYMOUR LEVINE
BY
ATTORNEY

INVENTORS
CLINTON D. BURDICK
SEYMOUR LEVINE
BY

ATTORNEY

United States Patent Office 3,492,735
Patented Feb. 3, 1970

3,492,735
APPARATUS FOR ORIENTING A GYROSCOP-ICALLY STABILIZED INERTIAL PLATFORM
Clinton D. Burdick, Great Neck, and Seymour Levine, Huntington, N.Y., assignors to Sperry Rand Corporation, a corporation of Delaware
Filed Jan. 31, 1967, Ser. No. 612,929
Int. Cl. G01c 17/00
U.S. Cl. 33—226                                 2 Claims

ABSTRACT OF THE DISCLOSURE

An inertial platform stabilized to local level is adapted to be initially oriented in azimuth by a 90° slewing procedure which yields respective values of the internal drifts of a north-south input axis gyro and an east-west input axis gyro, both on the platform together with an azimuth gyro. A computer means in the system develops a signal which is a measure of the average of the respective drifts and stores the signal and it is applied to compensate the platform heading information.

BACKGROUND OF THE INVENTION

The present invention pertains to gyroscopically stabilized inertial platforms utilizing a plurality of gyroscopes wherein it is desired to initially orient the platform with respect to an azimuthal reference such as true north. Certain prior art devices such as shown in U.S. Patent No. 2,771,779 of Schaffer et al. issued Nov. 27, 1956 entitled "Quick Setting Means for Gyro Stabilized Mechanisms" are oriented with respect to north by means of external directive magnetic field responsive devices which may be undesirable depending upon the application of the inertial platform. Certain other prior art devices endeavor to eliminate the need for external directive magnetic field responsive devices for azimuthal orientation but neglect to compensate for other errors such as gyro drift.

SUMMARY OF THE INVENTION

The gyroscopic apparatus of the present invention accurately orients a platform with respect to an azimuthal reference where the platform is mounted for freedom about a vertical axis and orthogonal horizontal axes. It has first stabilization means for the stabilizing the platform with respect to one of the horizontal axes utilizing first gyroscopic means mounted on the platform with an east-west input axis and second stabilization means for stabilizing the platform with respect to the other of the horizontal axes having second gyroscopic means mounted on the platform with a north-south input axis. It further includes means for positioning the platform 90° to approximately align the east-west and north-south input axes on approximate north-south and east-west headings respectively and computing means responsive to the first stabilization means for determining the internal drift of the first gyroscopic means with its input axis approximately north-south. The computing means is further responsive to the second stabilization means for determining the approximate heading error of the platform. Means are included for repositioning the platform 90° plus an amount to compensate for the heading error for aligning the input axis of the second gyroscopic means substantially north-south. The computing means is also responsive to the second stabilization means for determining the internal drift of the second gyroscopic means. An average measure of the gyro drifts may be obtained for compensation or alignment purposes. Further, the sum or difference of the gyro drifts may be used for malfunction or system check.

BRIEF DESCRIPTION OF THE DRAWINGS

Referring now to the drawings.

Referring now to FIG. 1, a stable member or platform 1 is mounted on a craft indicated at 2. The mounting structure for the platform 1 includes an outer roll gimbal 3 rotatably supported on the craft 2 by spaced bearings 4—4 for rotation about an axis 5 corresponding to the fore and aft axis of the craft 2. A pitch gimbal 6 is in turn rotatably supported by the outer roll gimbal 3 with freedom about a normally horizontal axis corresponding to the pitch axis 7 of the craft 2. An inner roll gimbal 8 is rotatably carried by the gimbal 6 with freedom about an axis 9 that is normally horizontal and aligned with the axis 5. A normally vertical axis 10 of the stable platform 1 is defined by a shaft 11 which rotatably connects the platform 1 to the gimbal 8. Accordingly, the described gimbal structure mounts the platform on the craft with freedom about three mutually orthogonal axes, one of which is normally vertical as indicated by the axis 10 and two of which are normally horizontal as respectively indicated by the axes 9 and 7. The platform 1 also functions as an azimuth gimbal.

The stabilizing elements further include a levelling motor S-22 mounted on gimbal 3 and connected to gimbal 6 to maintain the platform level with respect to axis 7. Levelling about axis 9 is provided for the platform 1 by a motor S-11 mounted on gimbal 6 and connected to gimbal 8. The operation of the respective motors S-11 and S-22 is dependent on the angular relation between the rotor and stator components of a resolver 12 whose rotor is connected to shaft 11 and whose stator is fixedly mounted on gimbal 8. The elements of the combination that provide inputs to the resolver 12 include a first single degree of freedom gyroscope G-1 shown in FIG. 1 mounted on the platform 1 to precess about a vertical axis 14 and spin about a horizontal axis 15. The gimbal of gyroscope G-1 precesses about axis 14 and includes the rotor parts of a torque motor TM-1 and a pick-off PO-1. The stators of the elements TM-1 and PO-1 are fixed with relation to the platform 1. The element pick-off PO-1 provides an electrical output in accordance with the displacement of the gyroscope G-1 from a null or reference condition with respect to its precession axis 14. The other element of the related portion of the stabilizing combination for resolver 12 is provided by a tilt sensor in the form of a liquid level A-1. As shown in FIG. 1, the sensor A-1 is fixedly mounted on the platform 1 so that normally the horizontal spin axis of the gyroscope G-1 is aligned with its longitudinal axis.

The other of the inputs to the resolver 12 is provided by a second single degree of freedom gyroscope G-2 that is mounted on the platform 1 to precess about a vertical axis 16 and spin about a horizontal axis 17. The gimbal of gyroscope G-2 precesses about axis 16 and includes the rotor parts of a torque motor TM-2 and a pick-off PO–2. The stators of the elements TM–2 and PO–2 are fixed with relation to the platform 1. The pick-off element PO–2 provides an electrical output in accordance with the displacement of the gyroscope G–2 from a null or reference condition with respect to the precession axis 16 that is perpendicular to the null of PO–1. The normally horizontal spin axes 15 and 17 and the gyroscopes G–1 and G–2 of the combination are accordingly disposed in mutually perpendicular relation as indicated in FIG. 1. The element equivalent to the tilt sensor A–1 for the gyroscope G–2 is provided by a tilt sensor or liquid level A–2. As shown in FIG. 1, the sensor A–2 is fixedly mounted on the platform 1 with its longitudinal axis horizontal and normally aligned with the spin axis 17 of the gyroscope G–2. The liquid levels A–1 and A–2 sense the tilt along their respective longitudinal axes which depends on the orientation of the platform about axis 10.

As shown in FIG. 2, a lead 18 connects sensor A–1 to the torque motor TM–1 of the stabilizing gyroscope G–1 to control the platform 1 with respect to axis 9 by way of a lead 19 between pick-off PO–1 and the resolver 12 and lead 20 between the resolver 12 and the motor S–11. For the perpendicular horizontal axis 7 of the platform 1, the control includes a lead 21 between the sensor A–2 and torque motor TM–2, a lead 22 between the pick-off PO–2 and the resolver 12, and a lead 23 between the resolver 12 and the motor S–22. In the described combination, the motors S–11 and S–22 are responsive to the output of the resolver 12 to maintain the platform level about its respective axes 7 and 9 as it moves about axis 10. Also, gimbal 3 of the combination is stabilized about axis 5 by a motor S–24 that is responsive to the output of a pick-off 24 mounted on ring 6. The output of the pick-off 24 is dependent on relative angular displacement of the gimbals 3 and 6 from an out of level condition about the axes 5 and 9. A lead 27 connects the pick-off 24 to the motor S–24.

To provide stabilization for the platform 1 about axis 10, the gyroscope means of the combination includes a third single degree of freedom gyroscope G–3 similar in character to the gyroscopes G–1 and G–2. As shown in FIGS. 1 and 3, the gyroscope G–3 is mounted on the platform or member 1 with its precession axis 25 normal to the vertical axis 10 and its rotor axis 26 normally horizontal. Torque motor TM–3 exerts a torque about the precession axis 25. Also, pick-off PO–3 provides an output depending on the angular displacement of the gyroscope G–3 from a null condition about axis 25 where the axis 26 is horizontal. Motor S–33 carried by the gimbal 8 is responsive to the output of the pick-off PO–3 to control the motion of the platform 1 about axis 10. As shown in FIG. 2, lead 28 connects the pick-off PO–3 to the motor S–33.

Figure 1:
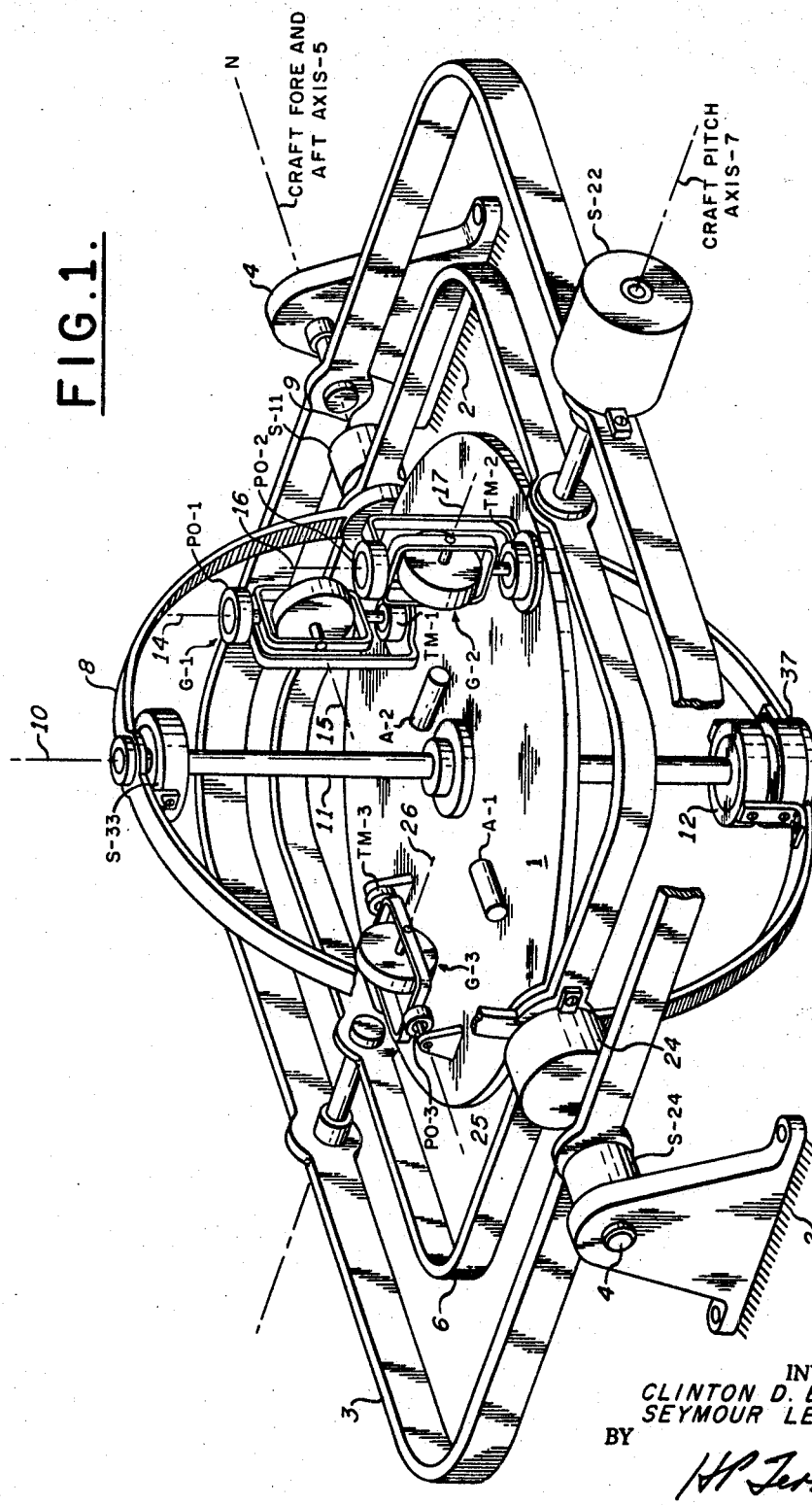
FIG. 1 is a perspective view of an inertial platform showing the stabilizing gyroscopes and the gimballing structure between the platform and the craft on which it is mounted.

To provide for fine alignment of the platform 1 with true north or any other desired heading and to further provide for calibration of the gyroscopes G–1 and G–2 as well as to provide a system malfunction check, the leads 18 and 21 as well as a lead 29 from an azimuth resolver 37 are connected to a computer 30. The azimuth resolver 37 is coupled to the shaft 11 in a manner similar to resolver 12. The azimuth resolver 37 is connected via lead 29 to the torque motor TM–3. With the craft 2 stationary, the signals appearing on the respective leads 18, 21 and 29 are proportional to the total drift rates of the gyroscopes G–1, G–2 and G–3 respectively. The output of the computer 30 is connected via leads 31, 32 and 33 to provide compensating torques to the torque motors TM–1, TM–2 and TM–3 respectively. The output of the computer 30 is also connected via lead 34 to the motor S–33 and via lead 35 to a malfunction warning light 36 or other suitable malfunction device.

In operation, with the craft 2 stationary, the platform 1 is initially aligned with a desired heading such as true north to within predetermined angular limits such as plus or minus three degrees. The initial alignment may be accomplished in a conventional manner by slewing the platform. Alternatively, a transfer gyro technique such as disclosed in U.S. Patent No. 3,253,472 entitled "Transportable Gyroscopic and Power Equipment" by M. S. Klemes, issued on May 31, 1966 may be utilized or the platform 1 may be caged to within the desired initial alignment limits.

Figure 3:
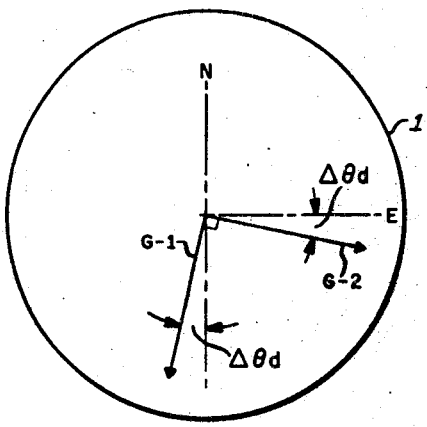
FIG. 3 is a schematic view showing the angular relation between the input axes of gyroscopes G-1 and G-2 and the platform when the platform is slewed 90° from its initial position.

To provide fine alignment of the platform 1 with the true north, the computer 30 provides a signal when the system is placed in a fine alignment mode which controls the motor S–33 either directly or via the torque motor TM–3, the gyro G–3 and the pick-off PO–3 to drive the azimuth gimbal or platform 1 exactly 90° so that the input axis of the gyro G–1 points approximately south as shown in FIG. 3 and the input axis of the gyro G–2 points approximately east. The input axis of the gyro G–2 is then actually displaced $90° + \Delta\theta_d$ from true north where $\Delta\theta_d$ represents a heading error and likewise the input axis of the gyro G–1 is displaced from true south by $\Delta\theta_d$. In this position of the platform 1, the gyro G–3 is torqued at the vertical component of earth rate and its stored drift as determined during the conventional initial or coarse alignment mode.

With the true platform heading, $\theta_d$, at approximately $90° + \Delta\theta_d$, where $\Delta\theta_d$ is a small angle less than 5°, the total drifts of the gyros G–1 and G–2 are as follows:

$$P_1 = D_1 - \Omega_E \cos L \cos \Delta\theta_d \cong D_1 - \Omega_E \cos L \quad (1)$$
$$P_2 = D_2 - \Omega_E \cos L \sin \Delta\theta_d \cong D_2 - \Omega_E \cos L \Delta\theta_d \quad (2)$$

where:

$P_1$ = total drift of gyro G–1
$P_2$ = total drift of gyro G–2
$D_1$ = internal drift of gyro G–1
$D_2$ = internal drift of gyro G–2
$\Omega_E$ = earth rotation rate measured at equator
$L$ = latitude of craft
$\Delta\theta_d$ = platform heading error To compensate for the effect of the horizontal component of the earth rate at the latitude of the craft on the gyro G–1, the computer 30 provides a signal representative of the horizontal component of the earth rate, $\Omega_E \cos L$, to the torquer TM–1 of the gyro G–1 resulting in:

$$P_1 = D_1 - \Omega_E \cos L + \Omega_E \cos L = D_1 \quad (3)$$

No earth rate signals are applied to the gyro G–2. Now using a standard gyro calibrate mode or by other conventional means, the total drift signals $P_1$ and $P_2$ are measured. Since now $P_1 = D_1$, the gyro G–1 can now be compensated for its internal drift $D_1$ by computer processing. The heading error $\Delta\theta_d$ has a negligible effect on the signal $P_1$ from the gyro G–1 since its input axis is south and responsive to the maximum value of the horizontal component of earth rate at the flat portion of the horizontal earth rate vs. gyro input axis alignment curve as shown in FIG. 5.

Figure 5:
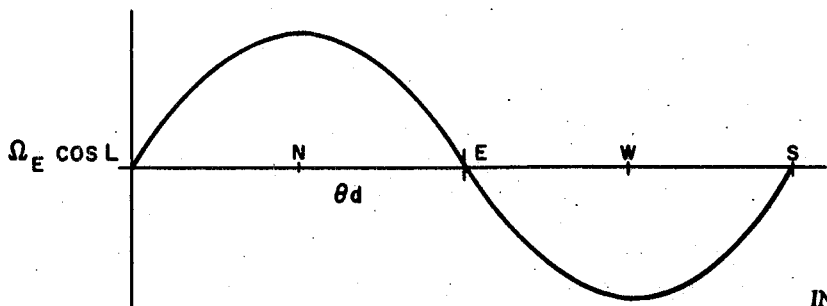
FIG. 5 is a graph representing the variation of the horizontal component of earth rate as a function of the heading $\theta_d$ of the platform.

The internal drift $D_2$ of the gyro G–2 cannot be distinguished from the drift caused by platform heading error $\Delta\theta_d$ since the input axis of the gyro G–2 is responsive to a minimum value of the horizontal component of earth rate but at a portion of the curve of FIG. 5 that has a rapidly changing slope. The computer 30 processes the total drift $P_2$ of the gyro G–2 and assumes it is all heading error in accordance with the following equation:

$$P_2 = -\Omega_E \cos L \overline{\Delta\theta_d} \quad (4)$$

$$\overline{\Delta\theta_d} = \frac{P_2}{-\Omega_E \cos L} = \frac{-D_2}{\Omega_E \cos L} + \frac{\Omega_E \cos L}{\Omega_E \cos L} \Delta\theta_d = \frac{-D_2}{\Omega_E \cos L} + \Delta\theta_d \quad (5)$$

where $\overline{\Delta\theta_d}$ is the first estimate of the platform heading error and is in error by the drift $D_2$ of gyroscope G–2.

The computer 30 processes the G–3 gyro drift signals and solves for the G-3 gyro drift by applying the vertical component of earth rate to the torque motor TM-3 in a manner similar to that described with respect to the gyro G-1, except the vertical component of earth rate is used instead of horizontal component.

Thus the computer 30 provides a compensation torque to the torque motor TM-1 to compensate for the total drift $P_1$ of the gyro G-1 equal to $D_1+\Omega_E \cos L$. It also provides a compensation torque to the torque motor TM-3 to provide for the total drift $P_3$ of the gyro G-3.

The computer 30 then provides a signal to the motor S-33 to slew the platform 1 in azimuth by an amount equal to $$90°-\frac{D_2}{\Omega_E \cos L}+\Delta\theta_d$$

Figure 4:
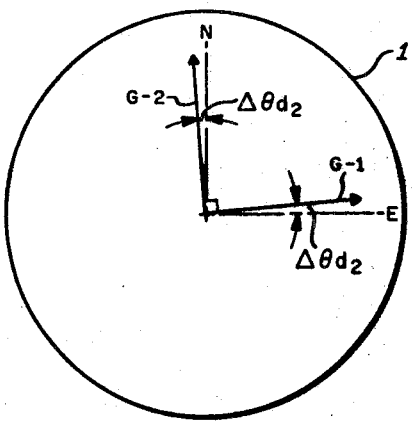
FIG. 4 is a view similar to FIG. 3 showing the platform returned to its normal operating position.

The platform 1 is now in error by $$\frac{-D_2}{\Omega_E \cos L}$$

with the input axis of the gyro G-1 pointing substantially east and the input axis of the gyro G-2 pointing substantially true north as shown in FIG. 4.

During the slewing interim, the correct earth rates and gyro biases are continuously supplied.

When the platform 1 reaches $\theta_D=0$ degrees, the computer 30 puts the heading of the platform 1 under the control of the gyro G-3. The gyro G-2 is torqued then at the horizontal component of earth rate and the gyro G-3 is torqued at the vertical component of earth rate. The gyro G-1 is torqued at its computed value of drift $D_1$ obtained at $\theta_D=90°$. Thus, $$\gamma_1=-\Omega_E \cos L \sin \Delta\theta_{d_2} \quad (6)$$

$$\gamma_2=D_2+\Omega_E \cos L \cos \Delta\theta_{d_2}-\Omega_E \cos L\cong D_2$$
$$D_2=\Omega_E \cos L \sin \Delta\theta_{d_2} \quad (7)$$

where:

$\gamma_1$=total drift rate plus earth rate corrections of gyro G-1
$\gamma_2$=total drift rate plus earth rate corrections of gyro G-2

The computer 30 then solves for the drift correction $D_2$ of the gyro G-2 in a manner similar to that of the gyro G-1 when the latter had its input axis pointing south except that the sign is reversed since the input axis of the gyro G-2 is now pointing north. The drift correction $D_3$ of the gyro G-3 is also solved by the computer 30.

An averaged heading error $\Delta\theta_{d_2}$ is obtained by averaging the two measurements $\gamma_1$ and $\gamma_2$ in the computer 30 in accordance with the following equation:

$$\Delta\theta_{d_2}=\frac{\gamma_2-\gamma_1}{2\Omega_E \cos L} \quad (8)$$

Figure 2:
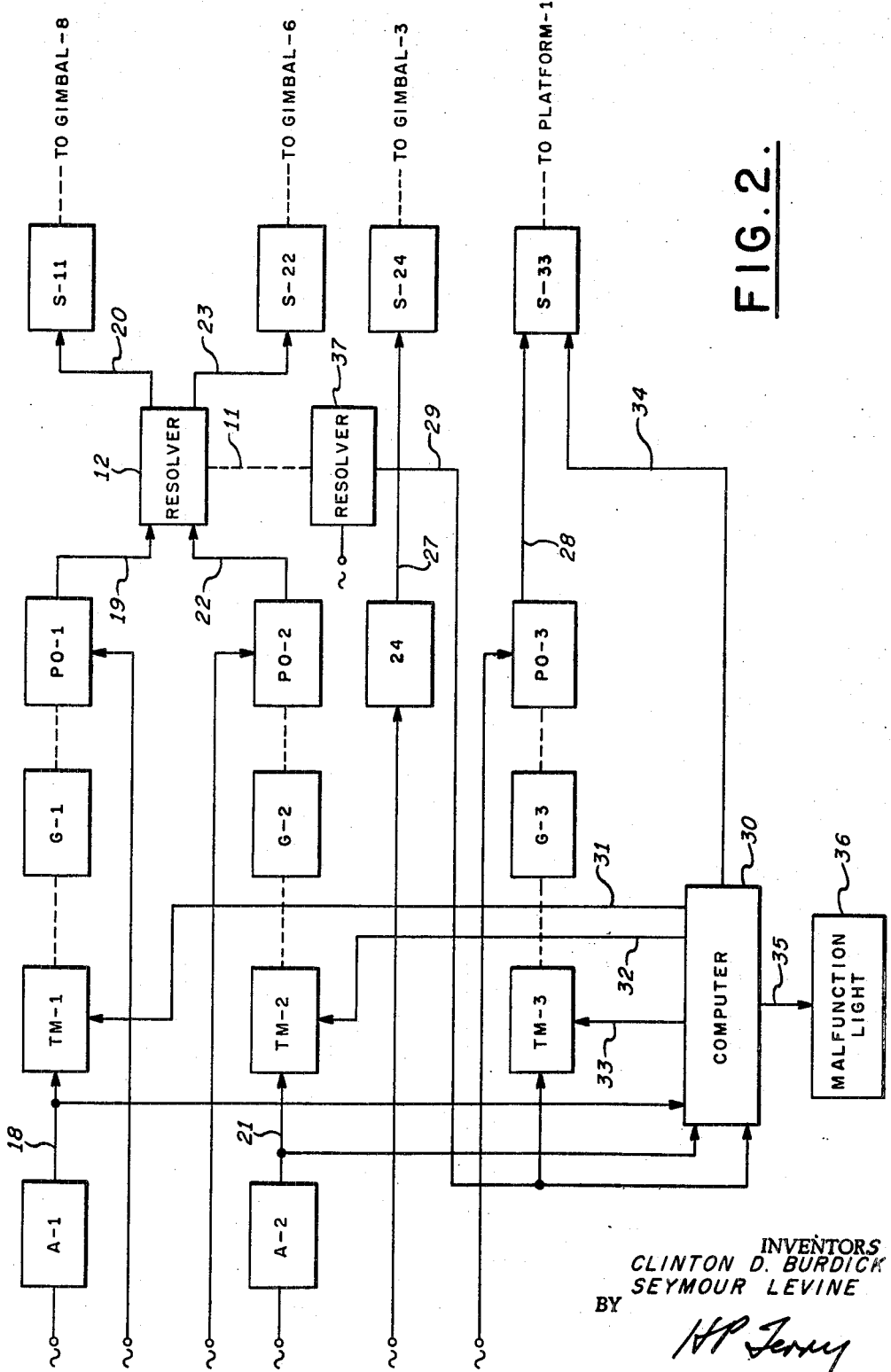
FIG. 2 is a combined diagrammatic view and circuit diagram in block form showing the interconnected elements of the system of the present invention.

This provides a statistical improvement in the heading error measurement. The averaged heading error signal $\Delta\theta_{d_2}$ is stored in the computer 30 for continuously updating or compensating the heading information. This may be accomplished by compensating the torque motors TM-1 and TM-2 by the stored signal $\Delta\theta_{d_2}$ from the computer 30 as shown in FIG. 2, or by slewing the platform 1 in azimuth by the amount of the signal $\Delta\theta_{d_2}$ to align the input axis of the gyro G-2 to true north, or by updating a suitable matrix with the $\Delta\theta_{d_2}$ signal from the computer 30.

The computer 30 also sums the gyro drift terms $\gamma_1$ and $\gamma_2$ for alignment and over-all system operation check. The sum of the gyro drifts $\gamma_1$ and $\gamma_2$ should be below a small predetermined threshold value, e.g., .1°/hr. for proper system operation. A value in excess of the threshold value indicates system and/or gyro scale factor error or malfunction which energizes the malfunction light 36. If the system fails this reasonableness check, the platform 1 is caused to cycle between $\theta_D=0°$ and $\theta_D=90°$ until the reasonableness check is satisfied and the light 36 extinguished. The system is then ready to be used in the navigate mode.

While the invention has been described in its preferred embodiments, it is to be understood that the words which have been used are words of description rather than limitation.

We claim:

1. In gyroscopic apparatus for accurately orienting a platform with respect to an azimuthal reference, said platform being mounted for freedom about a vertical axis and orthogonal horizontal axes, first stabilization means for stabilizing said platform with respect to one of said horizontal axes and having first gyroscopic means mounted on said platform with an east-west input axis, second stabilization means for stabilizing said platform with respect to the other of said horizontal axes and having second gyroscopic means mounted on said platform with a north-south input axis, means for rotating said platform to approximately align said east-west and north-south input axes on approximate north-south and east west headings respectively, computing means responsive to said first stabilization means for determining the internal drift of said first gyroscopic means with its input axis approximately north-south, said computing means being further responsive to said second stabilization means for determining the approximate heading error of said platform, means for rotating said platform an amount to compensate for said heading error for aligning said input axis of said second gyroscopic means substantially north-south, said computing means being further responsive to said second stabilization means for determining the internal drift of said second gyroscopic means, and means responsive to the internal drift measures of said first and second gyroscopic means for providing an average measure thereof.

2. In apparatus of the character recited in claim 1 including means responsive to said average measure for storing said average measure, and means responsive to said stored average measure for compensating said first and second gyroscopic means in accordance therewith.

References Cited

UNITED STATES PATENTS

| 3,241,363 | 3/1966 | Alderson et al. | |
| 3,377,854 | 4/1968 | Lee | 73—178 |

FOREIGN PATENTS

| 204,146 | 1/1956 | Australia. |

ROBERT B. HULL, Primary Examiner

U.S. Cl. X.R.

74—5.34